(12) United States Patent
Fontana, Jr. et al.

(10) Patent No.: US 7,839,607 B2
(45) Date of Patent: Nov. 23, 2010

(54) METHOD TO REDUCE CORNER SHUNTING DURING FABRICATION OF CPP READ HEADS

(75) Inventors: Robert E. Fontana, Jr., San Jose, CA (US); Ying Hong, Morgan Hill, CA (US); Wipul Pemsiri Jayasekara, Los Gatos, CA (US); Howard Gordon Zolla, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 768 days.

(21) Appl. No.: 11/890,868

(22) Filed: Aug. 7, 2007

(65) Prior Publication Data

US 2008/0020240 A1    Jan. 24, 2008

Related U.S. Application Data

(63) Continuation-in-part of application No. 11/081,222, filed on Mar. 15, 2005, now Pat. No. 7,270,758.

(51) Int. Cl.
*G11B 5/127* (2006.01)

(52) U.S. Cl. .................................. 360/324.12

(58) Field of Classification Search ............ 360/324.12, 360/324.1, 324.2, 324.11; 428/815; 427/127; 216/22, 74

See application file for complete search history.

(56) References Cited

U.S. PATENT DOCUMENTS

| | | | |
|---|---|---|---|
| 6,085,406 A | | 7/2000 | Garfunkel et al. |
| 6,176,005 B1 | | 1/2001 | Garfunkel et al. |
| 7,183,224 B2 | * | 2/2007 | Lee et al. .................... 438/736 |
| 7,525,765 B2 | * | 4/2009 | Kurita et al. ............. 360/235.4 |
| 7,729,088 B2 | * | 6/2010 | Kurita et al. ............. 360/234.4 |
| 2004/0105195 A1 | | 6/2004 | Fontana, Jr. et al. |
| 2005/0068672 A1 | * | 3/2005 | Lee et al. .................... 360/126 |
| 2005/0237667 A1 | * | 10/2005 | Chhabra et al. .......... 360/234.5 |
| 2006/0034014 A1 | * | 2/2006 | Kato et al. .................. 360/128 |
| 2006/0119971 A1 | * | 6/2006 | Kurita et al. .................. 360/69 |
| 2008/0037182 A1 | * | 2/2008 | Albrecht et al. ............. 360/323 |

OTHER PUBLICATIONS

IPCOM13530D: Fabrication of self-aligned side-by-side read/write head by using selective dry etching.

* cited by examiner

*Primary Examiner*—Allen T Cao
(74) *Attorney, Agent, or Firm*—Patent Law Office of Larry Guernsey; Larry B. Guernsey

(57) ABSTRACT

A method is presented for fabricating a CPP read head having a CPP read head sensor and a hard bias layer which includes forming a strip of sensor material in a sensor material region, and depositing strips of fast-milling dielectric material in first and second fast-milling dielectric material regions adjacent to the sensor material region. A protective layer and a layer of masking material are deposited on the strip of sensor material and the strips of fast-milling dielectric material to provide masked areas and exposed areas. A shaping source, such as an ion milling source, is provided which shapes the exposed areas. Hard bias material is then deposited on the regions of sensor material and fast-milling dielectric material to form caps on each of these regions. The caps of hard bias material and the masking material are then removed from each of these regions.

16 Claims, 16 Drawing Sheets

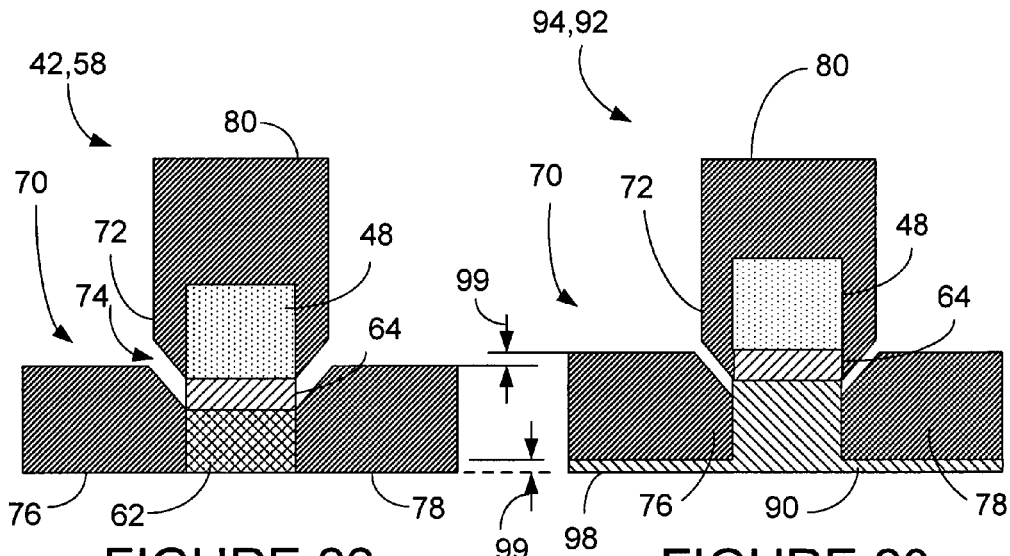
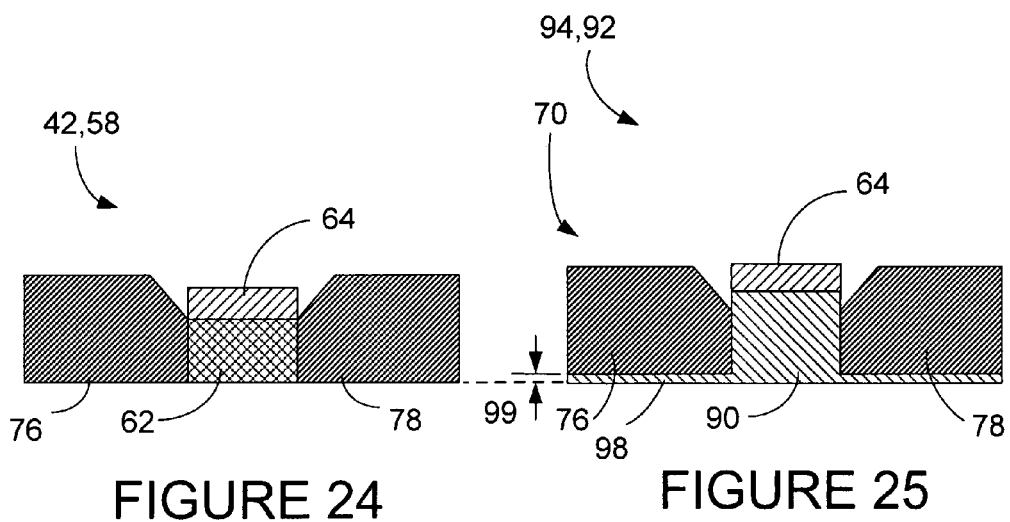

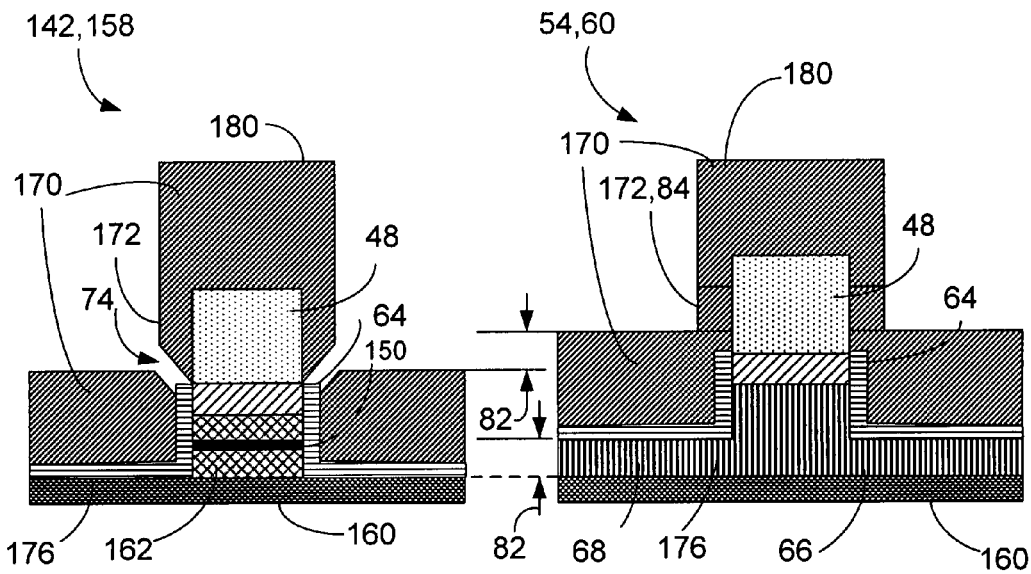
FIGURE 38 (Prior art)
FIGURE 39 (Prior art)
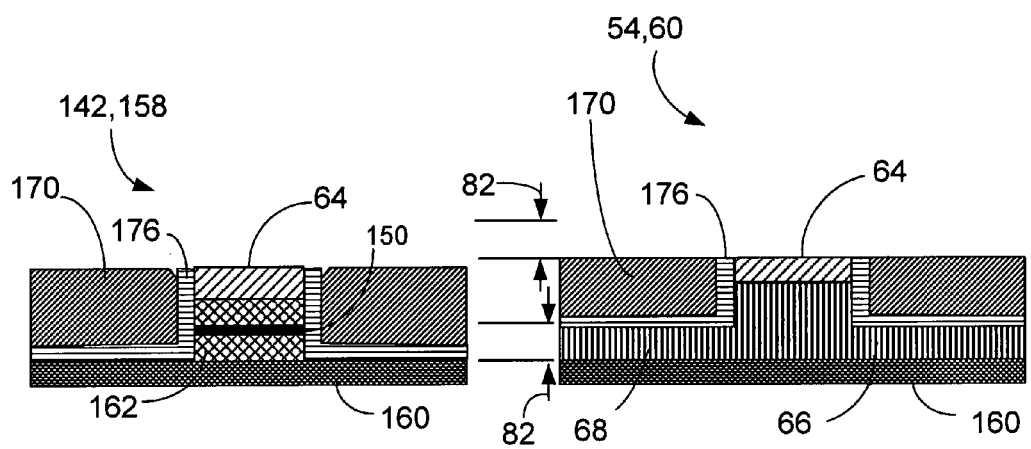
FIGURE 40 (Prior art)
FIGURE 41 (Prior art)

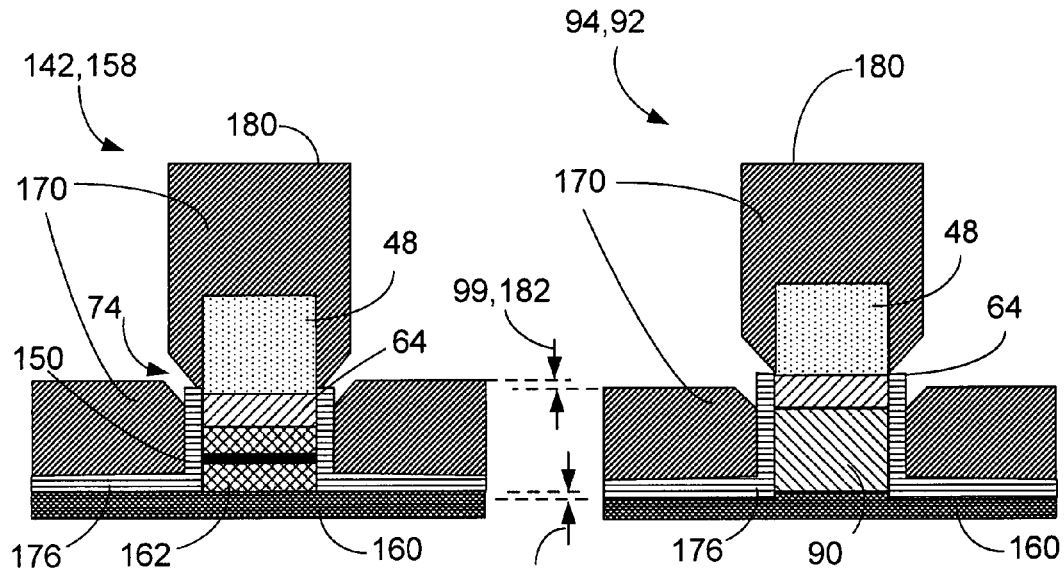
FIGURE 48
FIGURE 49
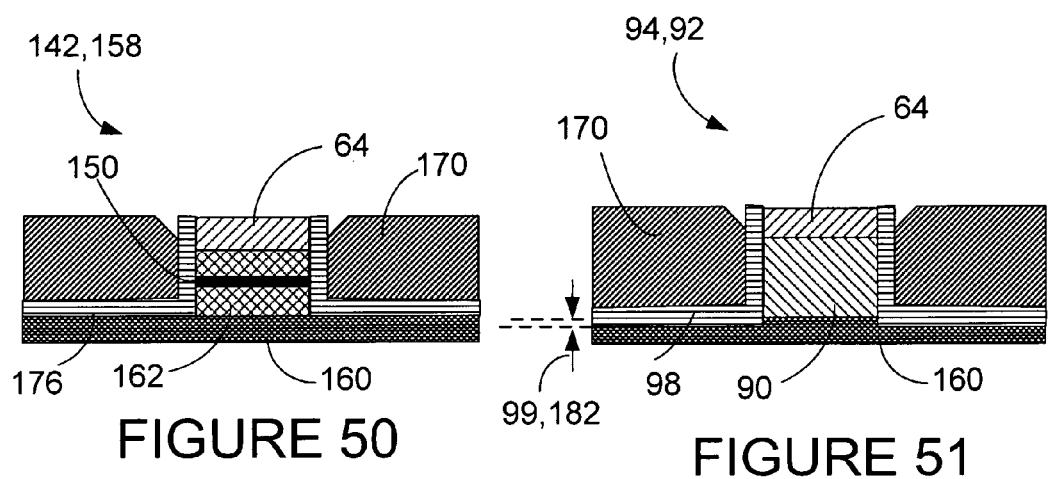
FIGURE 50
FIGURE 51

METHOD TO REDUCE CORNER SHUNTING DURING FABRICATION OF CPP READ HEADS

The following is a continuation in part of pending application Ser. No. 11/081,222, entitled "METHOD TO IMPROVE ABILITY TO PERFORM CMP-ASSISTED LIFTOFF FOR TRACKWIDTH DEFINITION," filed Mar. 15, 2005 now U.S. Pat. No. 7,270,758, having at least one common inventor; and, claims priority from and incorporates by reference pending application Ser. No. 11/081,222.

BACKGROUND OF THE INVENTION

1. Field of the Invention

The present invention relates generally to magnetic heads for reading data written to storage media, and more particularly to magnetic read heads for disk drives.

2. Description of the Prior Art

In recent years there has been a constant drive to increase the performance of hard disk drives by increasing the areal data storage density of the magnetic hard disk. This is done by reducing the written data track width, such that more tracks per inch can be written on the disk. This naturally requires that the width of the read head be reduced so magnetic field interference from adjacent data tracks is not picked up.

Read sensors, of which one type is referred to as a "spin valve", developed to read trackwidths smaller than 130 nm depend upon the ability to ion mill the sensor to these very small dimensions, and to reliably lift-off the deposited layer materials. A common problem with the fabrication of such small sensors is illustrated in FIGS. 5-15.

The sensor is typically formed of a stack of layers, which are generally formed as a region of magnetic material bounded by strips of dielectric or insulating materials. FIG. 5 shows a top plan view of a portion of a wafer 41 as it is being prepared for shaping into a sensor 40. The sensor material region 42 is shown to be bounded by a first dielectric material region 44 and a second dielectric material region 46. These first and second dielectric material regions 44, 46 are chosen to be of non-conducting material. In the prior art, these are preferably chosen to be alumina so that these make up first and second alumina regions 54, 56. A band of masking material 48 such as photoresist is then deposited to protect the material of the sensor material region 42, and first and second dielectric material regions 44, 46 from being cut away during shaping processes such as ion milling. The width of the band of masking material 48 establishes the eventual width of the read head sensor 40 and thus the magnetic read width (MRW) 50, which is approximately the same as, but somewhat less than, the trackwidth of the recorded track on the magnetic disk. The height of the sensor material region 42 establishes the stripe height 52 of the sensor 40.

The difficulty arises when the exposed portions of sensor material region 42 and first and second alumina regions 54, 56 are subjected to ion milling, since the sensor material 42 and the first and second alumina regions 54, 56 have different milling rates, the sensor material 42 is removed faster than the alumina 54, 56. A series of views of cross-sections of the sensor region 42, as taken through line 6-6 in FIG. 5, and the first alumina region, as taken through line 7-7 of FIG. 5 are shown side-by-side for comparison in FIGS. 6-15. Comparable stages of fabrication of a sensor layer stack 58 in the sensor region 42 are shown in FIGS. 6, 8, 10, 12 and 14, and of an alumina stack 60 in the alumina region 54 in FIGS. 7, 9, 11, 13 and 15, respectively. Since the relative heights of the layers at each stage of fabrication are at issue, the bottom of the sensor layer stack 58 and the bottom of the alumina layer stack 60, are aligned in the pairs of drawings.

In the first stage, FIG. 6 shows the layer of sensor material 62, protective layer 64, preferably composed of material such as Diamond-like carbon (DLC), and then a layer of masking material 48, and FIG. 7 shows the layer of alumina 66, protective layer 64 and masking material 48.

Next Reactive Ion Etching (RIE) is performed to shape the protective layer material 64 in both FIGS. 8-9.

FIGS. 10-11 show the effect of ion milling, which narrows the sensor material 62 to the dimensions of the mask material 48 and establishes the magnetic read width (MRW) 50. FIG. 11 shows that due to its slower milling rate, the alumina layer remaining 68 may be 200-300 Å thick, as compared to a typical sensor 62 thickness of 400 Å.

FIGS. 12 and 13 show the effects of depositing the hard bias/leads material 70 on both the sensor material region 42, and the first alumina region 54. The hard bias/leads are used to magnetically bias magnetic domains in certain layers of the sensor material 42, and also to supply electric current to the sensor 40. Therefore, in order to maintain the function of the sensor, it is important that the leads are not shorted together. The hardbias/leads material 70 is deposited in a blanketing layer over both the sensor material region 42 and alumina regions 54, 56, (see FIG. 5). In the sensor region 42, the height of the masking material 48 is such that the hard bias/leads material 70 on the masking material 48 is removed vertically far enough from the material 72 deposited on the sides of the sensor that a gap 74 remains, so that three separate elements are formed, namely a first side lead 76 and second side lead 78, and a hard bias/lead material cap 80.

However in the alumina region 54, shown in FIG. 13, since the residual step 68 remains, the hard bias/leads material 70 is raised vertically by this step height 82, as shown by the two set of arrows 82. Consequently, there is not enough vertical displacement of the side leads 76 and the cap 80, so that there is no gap, and side material 72 commonly forms bridges 84 between them. First and second leads 76, 78 are thus no longer electrically isolated, and are thus shorted together.

The next process, shown in FIGS. 14 and 15, is a CMP (Chemical Mechanical Polishing) assisted liftoff. As shown in FIG. 14, this is intended to remove the cap 80 and the masking material 48 from the sensor 62, leaving the first and second leads 76, 78 electrically isolated from each other, except for the conductive path through the sensor 62, as it should be. However, as shown in FIG. 15, in the alumina region 54, the masking material 48 has been unintentionally encapsulated by the hard bias/lead layer 70, which is not removed by the CMP assisted process. Thus, this leaves an electrical short between the first and second side leads 76, 78, which must be removed if the sensor 62 is to function properly.

Thus, there is a need for a fabrication method that prevents the formation of bridges in hardbias/lead material layer that produces electrical short circuits in disk drive read sensors.

SUMMARY OF THE INVENTION

A preferred embodiment of the present invention is a method for fabricating a CPP read head for a hard disk drive having a CPP read head sensor and a hard bias layer. The method includes depositing a strip of sensor material in a sensor material region, and depositing strips of fast-milling dielectric material in first and second fast-milling dielectric material regions adjacent to the sensor material region. Next, a protective layer is deposited on the sensor material region and the first and second fast-milling material regions. A layer of masking material is deposited on the strip of sensor material and the strips of fast-milling dielectric material to provide masked areas and exposed areas. A shaping source, such as an ion-milling source, is provided which shapes the exposed areas. Hard bias material is then deposited on the regions of sensor material and fast-milling dielectric material to form caps of hard bias material on each of these regions. The caps of hard bias material and the masking material are then removed from each of these regions.

It is an advantage of the present invention that the production of short circuits between hard bias/leads is minimized, thus increasing production yields.

It is another advantage that photoresist is not encapsulated by hard bias/lead material and is thus more easily removed.

It is a further advantage of the present invention that more uniform topography is produced, thus simplifying subsequent processing steps.

It is another advantage of the present invention that corner shunting is reduced or eliminated.

It is yet another advantage of the present invention that a negative residual step height can be produced, allowing for easier CMP operations.

These and other features and advantages of the present invention will no doubt become apparent to those skilled in the art upon reading the following detailed description, which makes reference to the several figures of the drawing.

IN THE DRAWINGS

The following drawings are not made to scale as an actual device, and are provided for illustration of the invention described herein:

FIG. 16-25 show parallel pairs of cross-section views of the sensor region and the alumina region of the present invention at various stages of fabrication;

FIG. 32-41 show parallel pairs of cross-section views of the sensor region and the alumina region of the prior art at various stages of fabrication; and FIG. 42-51 show parallel pairs of cross-section views of the sensor region and the alumina region of the present invention at various stages of fabrication.

DETAILED DESCRIPTION OF THE PREFERRED EMBODIMENTS

The preferred embodiment of the present invention is a method of fabrication of read sensors that utilizes fast-milling dielectric material that more closely matches the milling rate of sensor material. The present invention is also a disk drive including a magnetic head having a read head having milled sensor layers above the dielectric layer, and a method for producing this read head.

Figure 1:
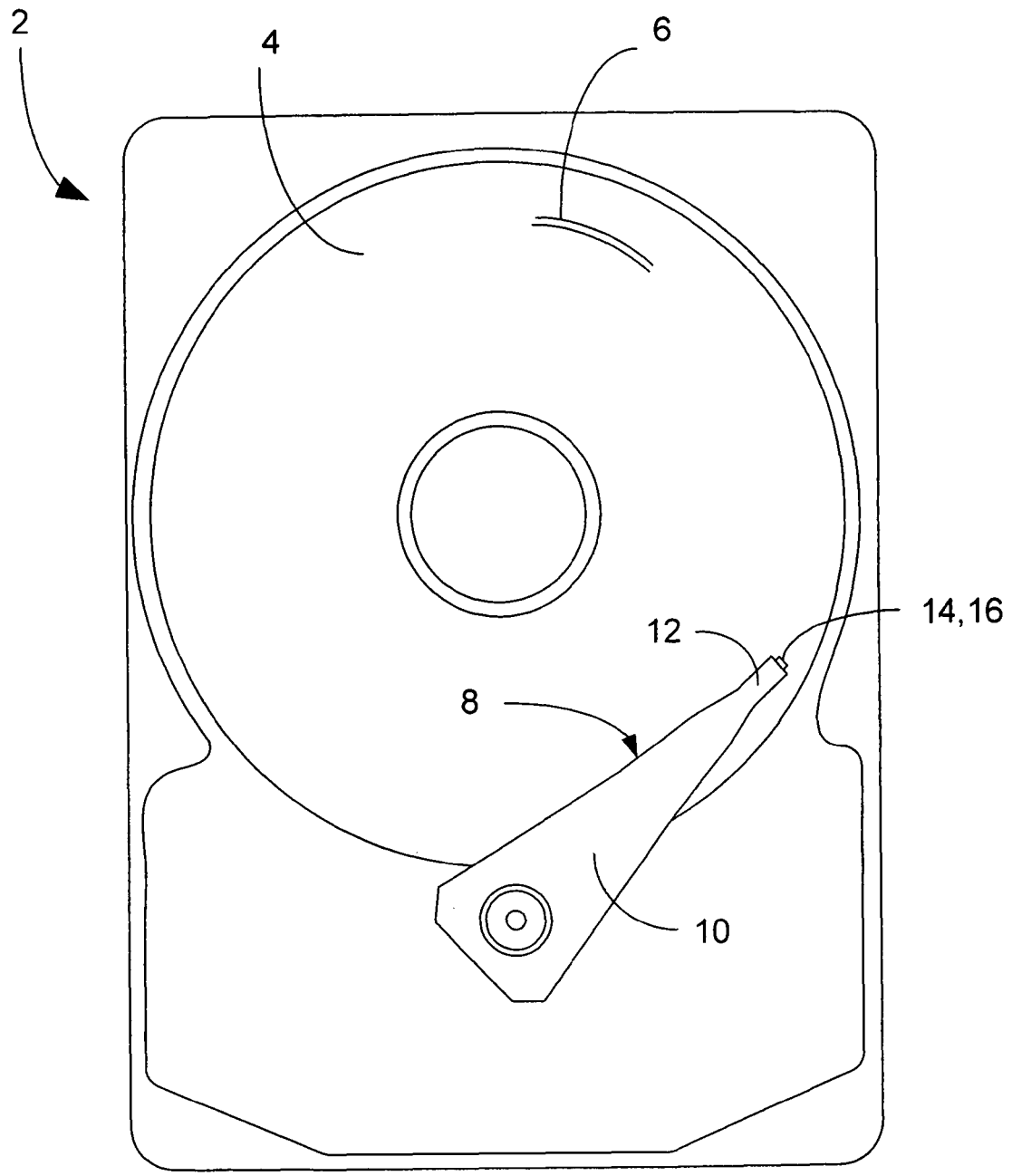
FIG. 1 shows a top plan view of an exemplary disk drive.

A hard disk drive 2 is shown generally in FIG. 1, having one or more magnetic data storage disks 4, with data tracks 6 which are written and read by a data read/write device 8. The data read/write device 8 includes an actuator arm 10, and a suspension 12 that supports one or more magnetic heads 14 included in one or more sliders 16.

Figure 2:
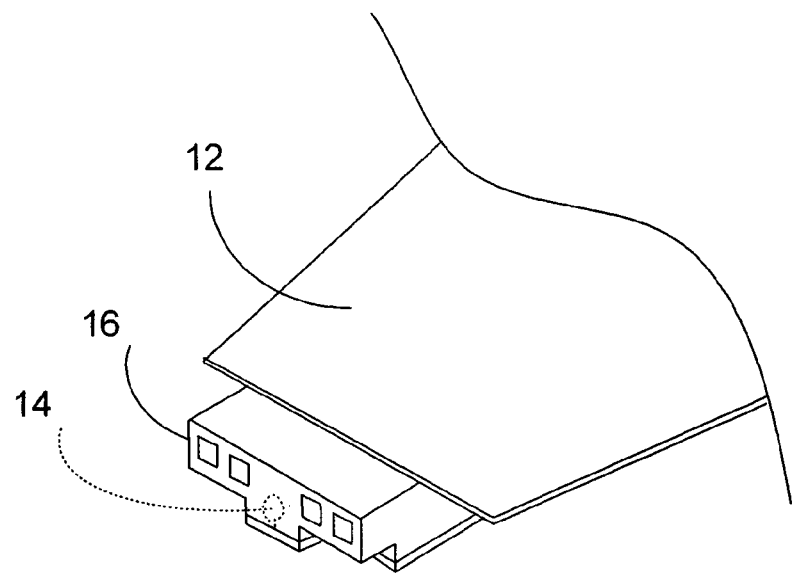
FIG. 2 illustrates a perspective view of view of an exemplary slider and suspension.
Figure 3:
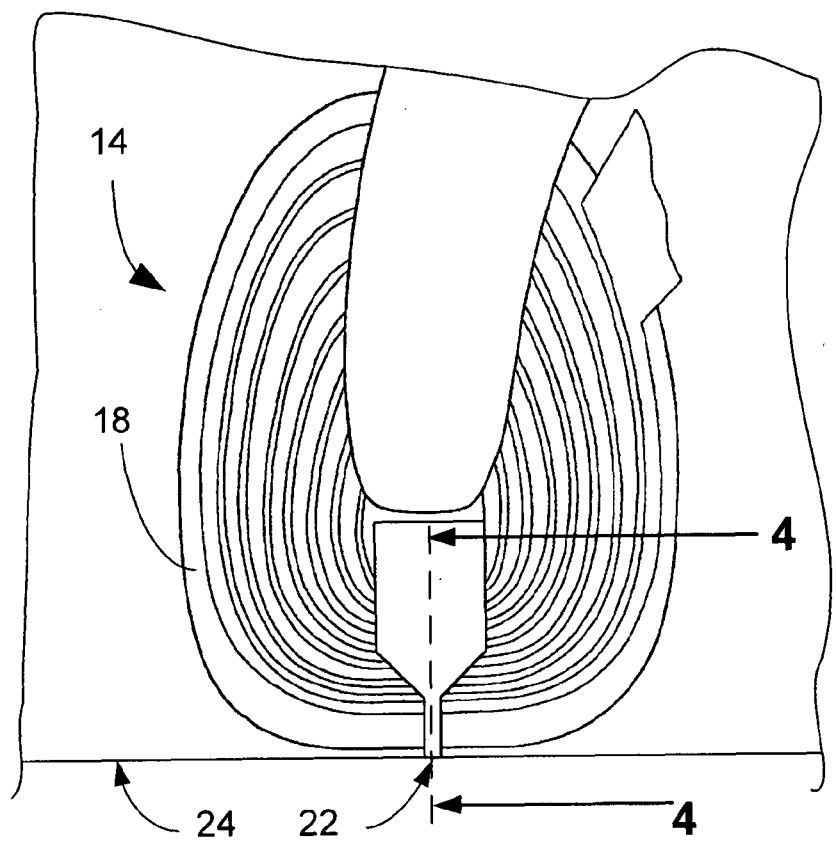
FIG. 3 shows a top plan view of an exemplary read/write head.

FIG. 2 shows a slider 16 in more detail being supported by suspension 12. The magnetic head 14 is shown in dashed lines, and in more detail in FIGS. 3 and 4. The magnetic head 14 includes a coil 18 and P1 pole, which also acts as S2 shield, thus making P1/S2 20. P1/S2 may also be made as two discrete layers. The second pole P2 22 is separated from P1/S2 by write gap 23.

The read sensor 40 is sandwiched between the first shield S1 30 and the second shield P1/S2 20. There is generally included an insulation layer 32 between the rest of the length of SI 30 and P1/S2 20. The magnetic head 14 flies on an air cushion between the surface of the disk 4 and the air-bearing surface (ABS) 24 of the slider 16. The write head portion 26 and the read head portion 28 are generally shown, with the read head sensor 40 and the ABS 24.

There are two configurations of read head in common use in the industry today. These are called Current Perpendicular to the Plane (CPP), and Current In the Plane (CIP). In the CPP configuration, Shield S1 and P1/S2 are made of conducting material which act as electrodes supplying current to the read sensor which lies between them.

The first embodiment of the present invention uses a CIP configuration, in which the current flows from side to side through the elements. For CIP read heads, the read sensor 40 is generally sandwiched between two insulation layers, usually designated G1 34 and G2 36 which are made of non-conductive material, to keep the circuit from shorting out.

Figure 4:
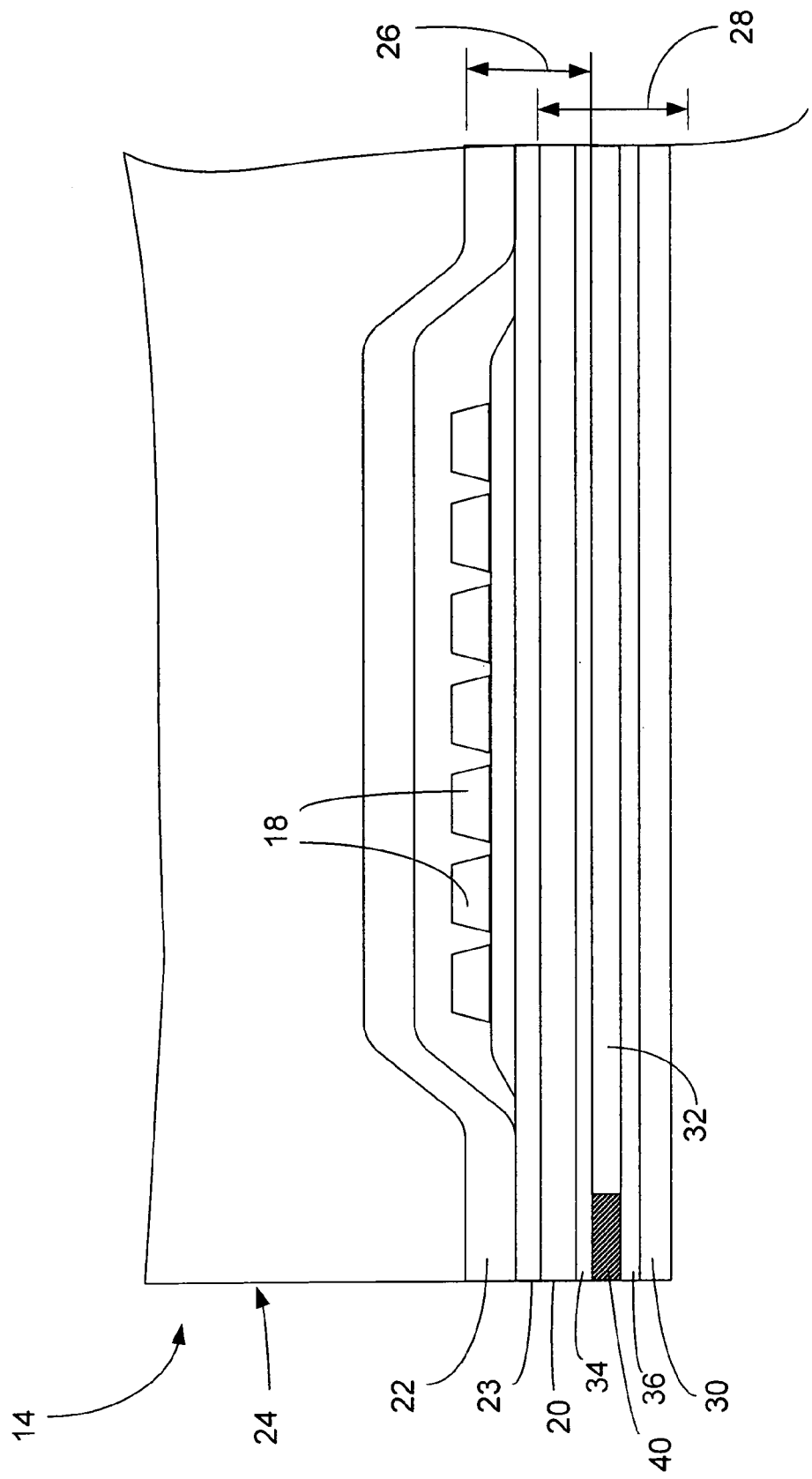
FIG. 4 is a cross-section view of an exemplary CIP read/write head.

Note that this structure is strictly for illustration only, and one skilled in the art will appreciate that sensor structures can vary dramatically from the one shown in FIG. 4, the methodology of the present invention being applicable to formation of all such heads.

Figure 5:
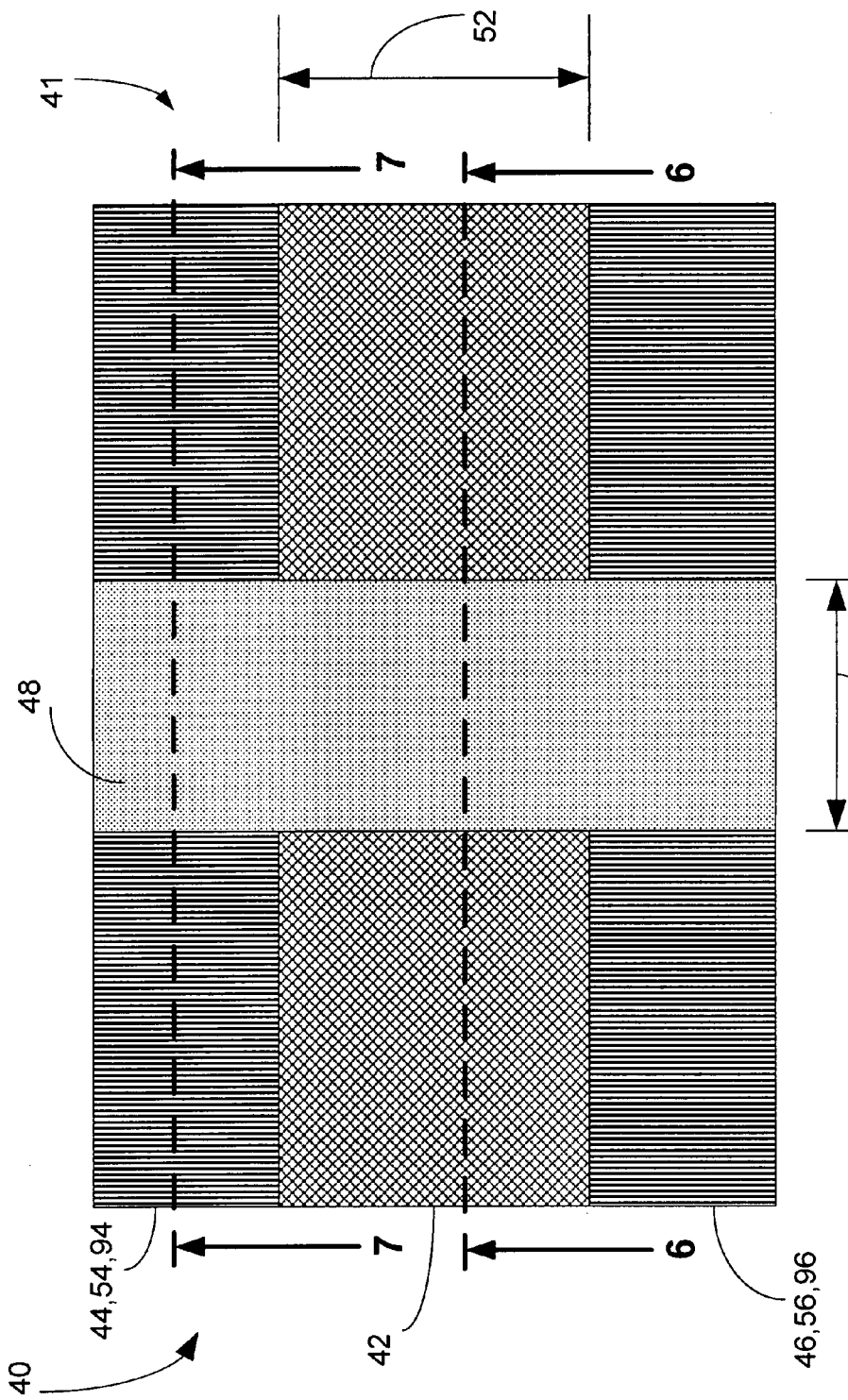
FIG. 5 shows a top plan view a portion of a CIP read sensor showing strips of alumina and sensor material and photoresist material.

The novelty of the present invention is best understood in comparison to processes of the prior art, as discussed above. A common problem with the fabrication of sensors of the prior art is illustrated in FIGS. 5-15. The sensor is typically formed of a stack of layers that are generally formed as a region of magnetic material bounded by strips of dielectric or insulating materials. FIG. 5 shows a top plan view of a portion of a wafer 41 as it is being prepared for shaping into a CIP sensor 40. The sensor material region 42 is shown to be bounded by a first dielectric material region 44 and a second dielectric material region 46. These first and second dielectric material regions 44, 46 are chosen to be of non-conducting material. In the prior art, these are preferably chosen to be alumina so that these make up first and second alumina regions 54, 56. A band of masking material 48 such as photoresist is then deposited to protect the material of the sensor material region 42, and first and second dielectric material regions 44, 46 from being cut away during shaping processes such as ion milling. The width of the band of masking material 48 establishes the eventual width of the read head sensor 40 and thus the magnetic read width (MRW) 50. The height of the sensor material region 42 establishes the stripe height 52 of the sensor 40.

The difficulty arises when the exposed portions of sensor material region 42 and first and second alumina regions 54, 56 are subjected to ion milling, since the sensor material 42 and the first and second alumina regions 54, 56 have different milling rates, the sensor material 42 being removed faster than the alumina 54, 56. A series of views of cross-sections of the sensor region 42, as taken through line 6-6 in FIG. 5, and the first alumina region, as taken through line 7-7 of FIG. 5 are shown side-by-side for comparison in FIGS. 6-15. Comparable stages of fabrication of a sensor layer stack 58 in the sensor region 42 are shown in FIGS. 6, 8, 10, 12 and 14 and of an alumina stack 60 in the alumina region 54 in FIGS. 7, 9, 11, 13 and 15, respectively. Since the relative heights of the layers at each stage of fabrication are at issue, the bottom of the sensor layer stack 58 and the bottom of the alumina layer stack 60, are aligned in the pairs of drawings.

Figure 6:
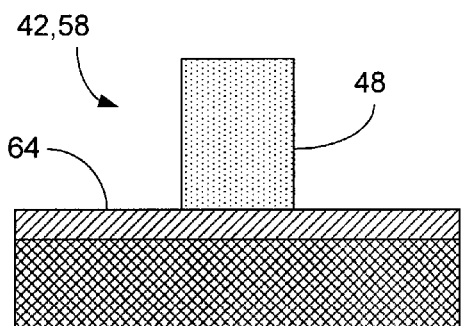
FIG. 6-15 show parallel pairs of cross-section views of the sensor region and the alumina region of the prior art at various stages of fabrication.
Figure 7:
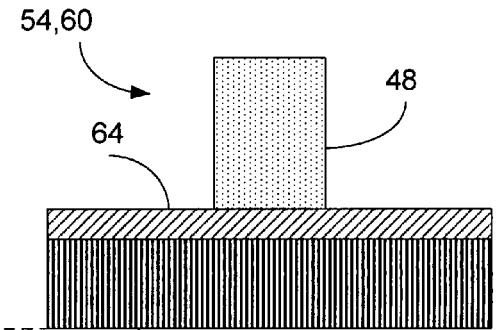

In the first stage, FIG. 6 shows the layer of sensor material 62, protective layer 64, preferably of material such as DLC, and then a layer of masking material 48, and FIG. 7 shows the layer of alumina 66, protective layer 64 and masking material 48.

Figure 8:
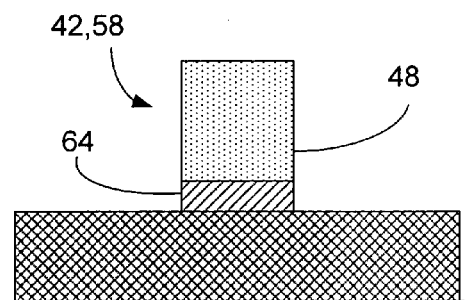
Figure 9:
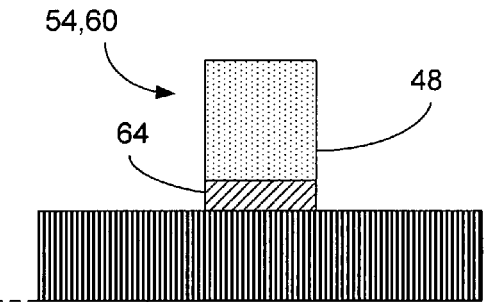

Next Reactive Ion Etching (RIE) is performed to shape the protective layer material 64 in both FIGS. 8-9.

Figure 10:
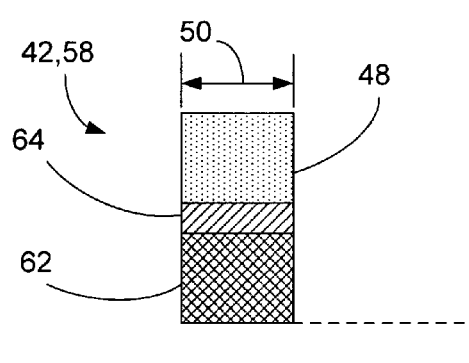
Figure 11:
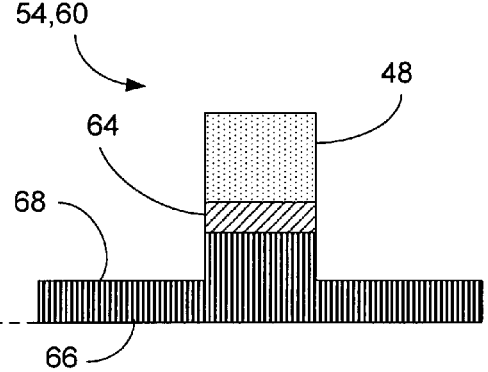

FIGS. 10-11 show the effect of a shaping operation such as ion milling, which narrows the sensor material 62 to the dimensions of the mask material 48 and establishes the magnetic read width (MRW) 50. FIG. 11 shows that due to its slower milling rate, the alumina layer remaining 68 may be 200-300 Å thick, as compared to a typical sensor 62 thickness of 400 Å.

Figures 12, 13:
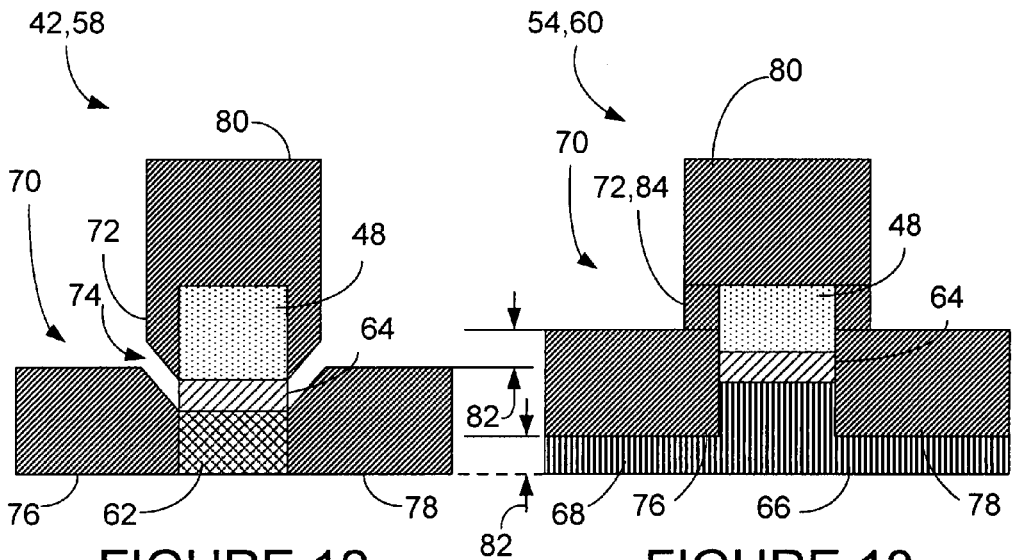

FIGS. 12 and 13 show the effects of depositing the hard bias/leads material 70 on both the sensor material region 42, and the first alumina region 54. The hard bias/leads are used to magnetically bias magnetic domains in certain layers of the sensor material 42, but also to supply electric current to the sensor 40. Therefore, in order to maintain the function of the sensor, it is important that the leads are not shorted together. The hardbias/leads material 70 is deposited in a blanketing layer over both the sensor material region 42 and alumina regions 54, 56, (see FIG. 5). In the sensor region 42, the height of the masking material 48 is such that the hard bias/leads material 70 on the masking material 48 is removed vertically far enough from the material 72 deposited on the sides of the sensor that a gap 74 remains, so that three separate elements are formed, namely a first side lead 76 and second side lead 78, and a hard bias/lead material cap 80.

However in the alumina region 54, shown in FIG. 13, since the residual step 68 remains, the hard bias/leads material 70 is raised vertically by this step height 82, as shown by the two set of arrows. Consequently, there is not enough vertical displacement of the side leads 76 and the cap 80, so that there is no gap, and side material 72 commonly forms bridges 84 between them. First and second leads 76, 78 are thus no longer electrically isolated, and are thus shorted together.

Figures 14, 15:
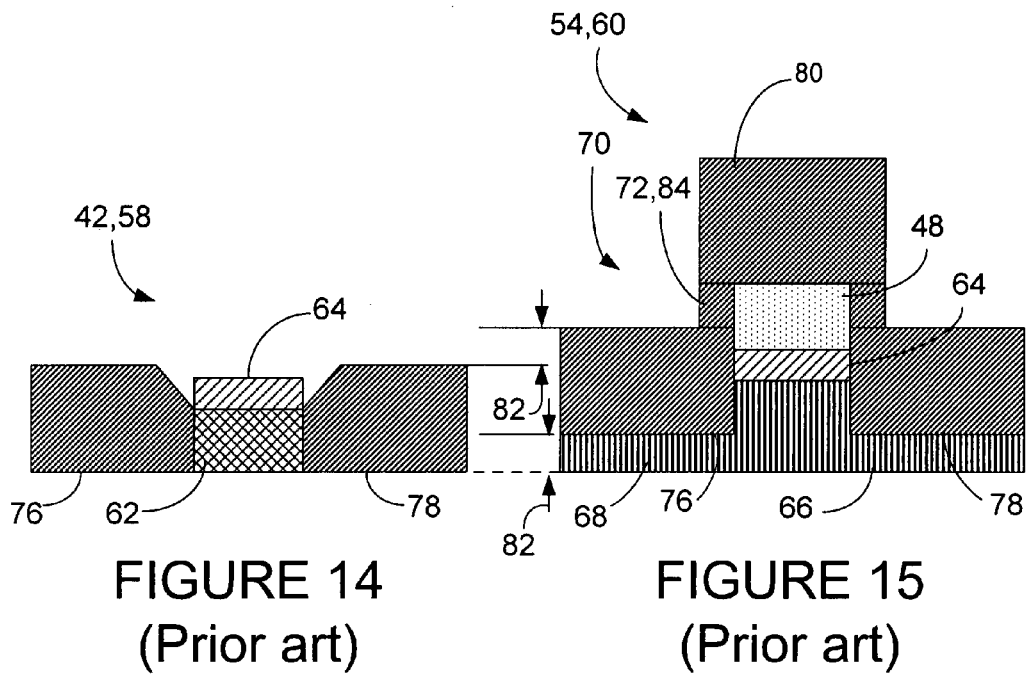

The next process, shown in FIGS. 14 and 15, is a CMP (Chemical Mechanical Polishing) assisted liftoff. As shown in FIG. 14, this is intended to remove the cap 80 and the masking material 48 from the sensor 62, leaving the first and second leads 76, 78 electrically isolated from each other, except for the conductive path through the sensor 62, as it should be. However, as shown in FIG. 15, in the alumina region 54, the masking material 48 has been unintentionally encapsulated by the hard bias/lead layer 70, which is not removed by the CMP assisted process. Thus, this leaves an electrical short between the first and second side leads 76, 78, which must be removed if the sensor 62 is to function properly.

In contrast, FIGS. 16-25 show the method of fabrication of the present invention. In place of alumina, a dielectric material having a milling rate more closely comparable to that of the sensor material is used. This material shall be referred to, purposes of this discussion, and in FIGS. 16-25, which follow, as fast-milling dielectric 90. Ideally, the milling rate of this fast milling dielectric would exactly match that of the sensor material. However, an exact match is not necessary, as long as the milling rates are close enough that a step height from residual material is small enough that bridges do not form in the hard bias/lead material which then interfere with the CMP assisted removal of the masking material and excess hard bias/lead material. It is estimated that a step height of 50 Å or less in the residual dielectric, which might be achieved through either full or partial mill, including a combination of mill angles, will provide satisfactory results. A partial list of materials which may be used as the fast-milling dielectric include $Ta_2O_5$, $SiO_2$, $Si_3N_4$, AlN, variable compositions of Al—Si—O—N, $HfO_2$, $ZrO_2$, and $Hf_{1-x}Si_xO_2$. It will be understood by those skilled in the art that this list is not to be considered limiting and that many other materials would fit the definition of fast-milling dielectrics.

In a similar manner to that shown before, FIG. 5 will be used to show the regions of sensor material, and a first region of fast-milling dielectric material 94 and second region of fast-milling dielectric material 96. As before, a series of views of cross-sections of the sensor region 42, as taken through line 6-6 in FIG. 5, and the first fast-milling material region 94, as taken through line 7-7 of FIG. 5 are shown, this time in FIGS. 16-25. Comparable stages of fabrication of a sensor layer stack 58 in the sensor region 42 are shown in FIGS. 16, 18, 20, 22 and 24 and of a fast-milling dielectric stack 92 in the first fast-milling dielectric material region 94 in FIGS. 17, 19, 21, 23 and 25, respectively. Once again, the bottom of the sensor layer stack 58 and the fast-milling dielectric stack 92, are level in the pairs of drawings.

Figure 16:
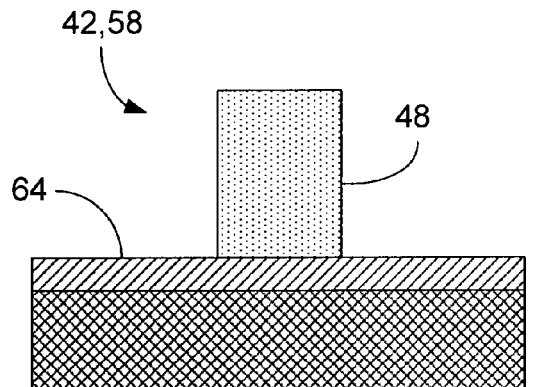
Figure 17:
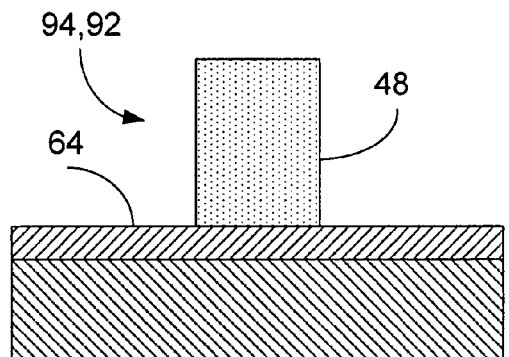

In the first stage, FIG. 16 shows the layer of sensor material 62, protective layer 64, preferably of material such as DLC, and then a layer of masking material 48, and FIG. 17 shows the fast-milling dielectric stack 92, including the layer of fast-milling dielectric material 90, protective layer 64 and masking material 48.

Figure 18:
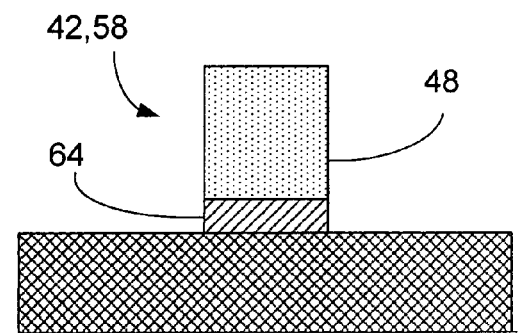
Figure 19:
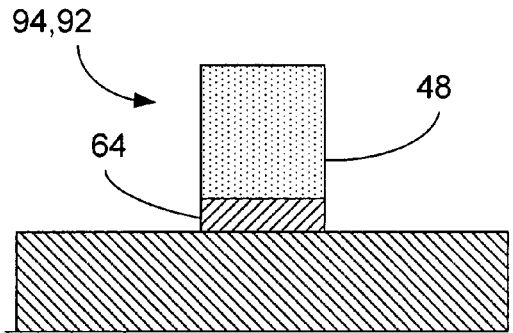

Next Reactive Ion Etching (RIE) is performed to shape the protective layer material 64 in both the sensor layer stack 58 and the fast-milling dielectric stack 92 as seen in FIGS. 18-19.

Figure 20:
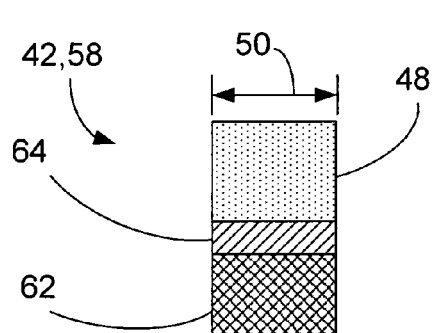
Figure 21:
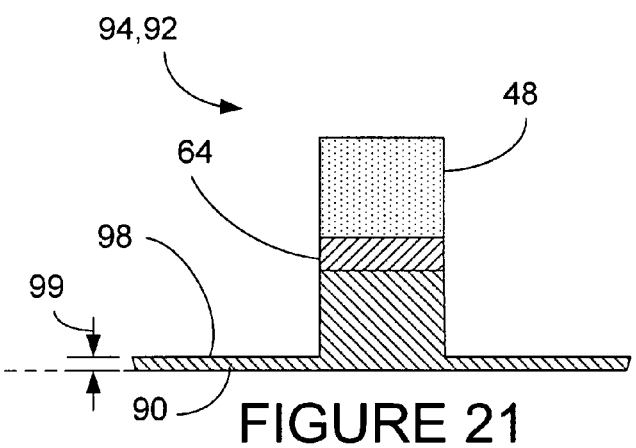

FIGS. 20-21 show the effect of ion milling, using any of a variety of ion-beam, etch tools, and which narrows the sensor material 62 to the dimensions of the mask material 48 and establishes the magnetic read width (MRW) 50. FIG. 21 shows that the fast-milling dielectric stack 92, due to its faster, but not exactly matching milling rate, still retains a reduced residual step 98 having a residual step height 99 which is 10-20 Å in height, compared to typical thickness of 400 Å of the sensor material 62. As referred to above, it is estimated that a step height of 50 Å or less in the residual dielectric will provide satisfactory results. This also compares favorably with a height of 100-200 Å of the residual step 68 of the prior art (see FIG. 13).

FIGS. 22 and 23 show the effects of depositing the hard bias/leads material 70 on both regions 42, 94 (see FIG. 5). In the sensor region 42, the height of the masking material 48 is such that the hard bias/leads material 70 on the masking material 48 is removed vertically far enough from the material 72 deposited on the sides of the sensor 62 that a gap 74 remains, so that three separate elements are formed, namely a first side lead 76 and second side lead 78, and a hard bias/lead material cap 80. In comparison, in the fast-milling dielectric stack 92 of the present invention, the reduced residual step 98 has a residual step height 99, which is small enough that there is still enough distance that the material 72 deposited on the sides of the sensor does not join with the material in the first side lead 76 and second side lead 78, and a gap 74 remains. Now there are three separate elements are formed, namely a first side lead 76 and second side lead 78, and a hard bias/lead material cap 80, as in the sensor layer stack 58.

When CMP assisted liftoff is completed, as shown in FIGS. 24 and 25, the cap 80 and the masking material 48 are removed from both the sensor 62, and the fast-milling dielectric stack 92 leaving both sets of first and second leads 76, 78 electrically isolated from each other, except for the conductive path through the sensor 62, as it should be.

As discussed above, there are two configurations of read head in common use in the industry today. These are called Current Perpendicular to the Plane (CPP), and Current In the Plane (CIP). The detailed description above had concerned a read head of the CIP configuration.

However, an alternative embodiment of the present invention concerns a read head of the CPP configuration. As a general convention, in the following discussion, when elements are similar to those used in the prior discussion, the same element numbers will be used. Elements that differ in the CPP configuration from those in the CIP configuration will use a numbering convention using elements in the 100s, wherever possible. Thus, the CIP read sensor was referred to as "40" and the CPP sensor will be referred to as "140".

Figure 26:
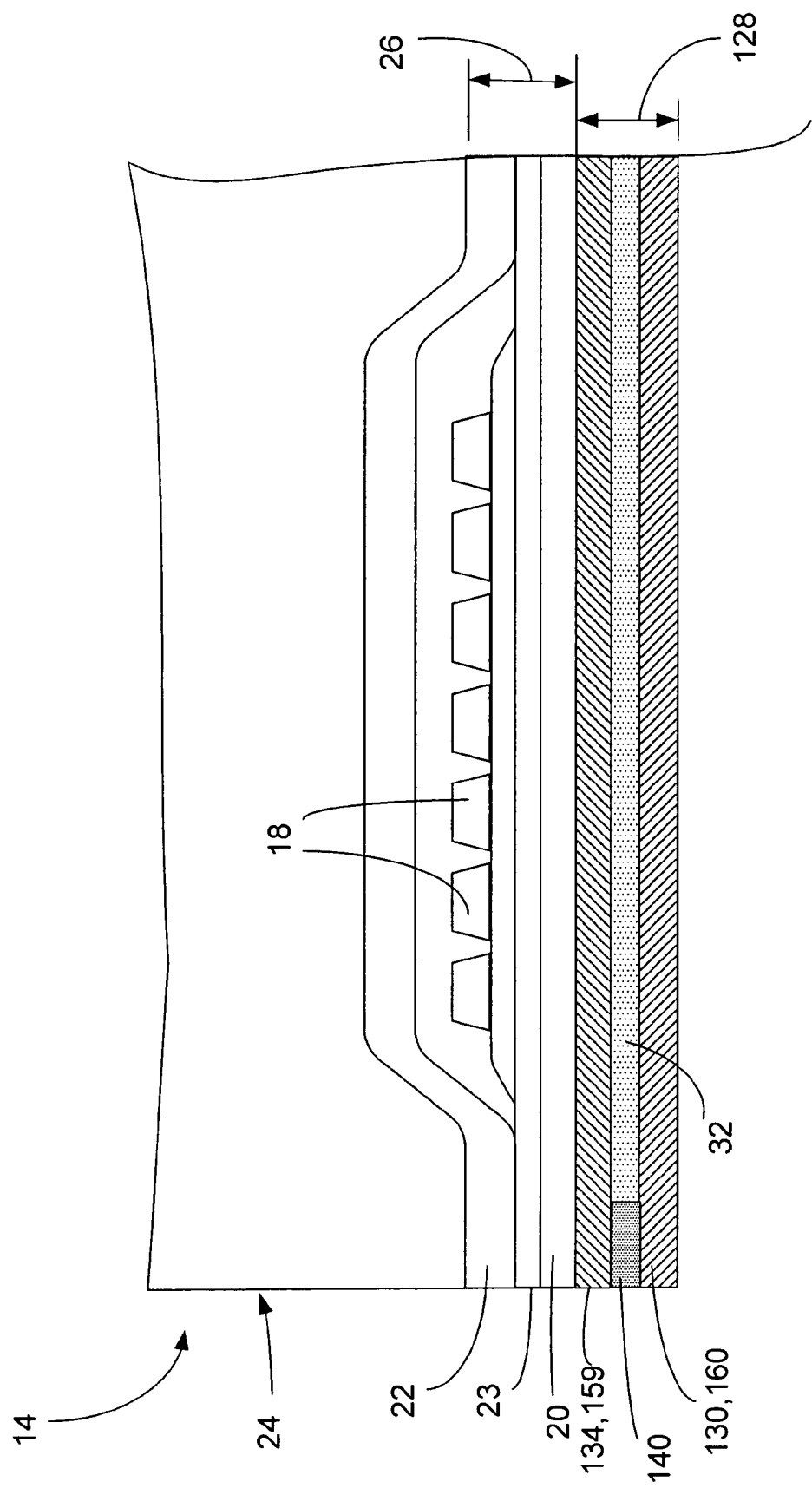
FIG. 26 is a cross-section view of an exemplary CPP read/write head.

In the CPP configuration, shields S1 and S2 are made of conducting material that act as electrodes supplying current to the read sensor that lies between them. The slider shown in FIG. 26 is of a Current Perpendicular to Plane (CPP), configuration wherein current flows vertically in the pictured figure rather than horizontally. The magnetic head 14 includes a coil 18, P1 pole 20, and a second pole P2 22 that is separated from P1 pole 20 by write gap 23. The P1 pole 20, second pole P2 22 and write gap 23 can be considered together to be included in the write head 26.

A read sensor 140 is sandwiched between a first shield, designated as S1 130 and a second shield S2 134, and these elements together make up the read head 128. In this configuration of read head 128 where Current is Perpendicular to the Plane (CPP), shields S1 130 and S2 134 act as top electrode 159 and bottom electrode 160, respectively, supplying current to the read sensor 140 that lies between them. An insulation layer 32 also separates the S1 130 and S2 134 electrical leads in the area behind the read sensor 140, so that the leads do not shunt current away from sensor. As before, the magnetic head 14 flies on an air cushion between the surface of the disk 4 and the air-bearing surface (ABS) 24 of the slider 16.

Note that this structure is strictly for illustration only, and one skilled in the art will appreciate that sensor structures can vary dramatically from the one shown in FIG. 26, the methodology of the present invention being applicable to formation of all such heads. In particular, an insulating layer (not shown) between S2 134 and P1 20 is present in the so-called "piggy-back" head design, whereas such an insulating layer is absent from the so-called "merged" head design shown in FIG. 26. The former "piggy-back" head design is that which is preferred in CPP sensors.

As in the CIP configuration discussed above, the fabrication process for a read head of CPP configuration can experience problems when the dielectric material surrounding the sensor mills at a slower rate than that of the sensor material. The CPP configuration, however, has different potential problems, one of which is illustrated in FIGS. 27 and 28 (prior art) and will be discussed below.

A common type of CPP sensor, called a TMR sensor, has an insulating tunnel barrier layer that separates two ferromagnetic layers. Sense current flows perpendicular to the surfaces of the ferromagnetic layers. In the TMR sensor, the sense current flowing through the tunnel barrier layer is strongly dependent upon a spin-polarization state of the two ferromagnetic layers. When the magnetizations of the two ferromagnetic layers are antiparallel to each other, the tunnel current is lowered, so that a high junction resistance is obtained. Alternately, when the magnetizations of the two ferromagnetic layers are parallel to each other, the tunnel current is heightened; and, thus, a low junction resistance is obtained.

In order to simplify the following discussion, the various layers of the TMR sensor are not illustrated with the exception of the tunnel barrier layer. The important point to note is that current flows from an upper electrode to a lower electrode through the sensor material. There should not be any other conductive path linking the electrodes directly to the tunnel junction layer aside from the conductive layers in the sensor itself, because this will shunt current away from the sensor with an attendant loss of its sensitivity, in effect partially, or completely, "shorting out" the sensor.

Figure 27:
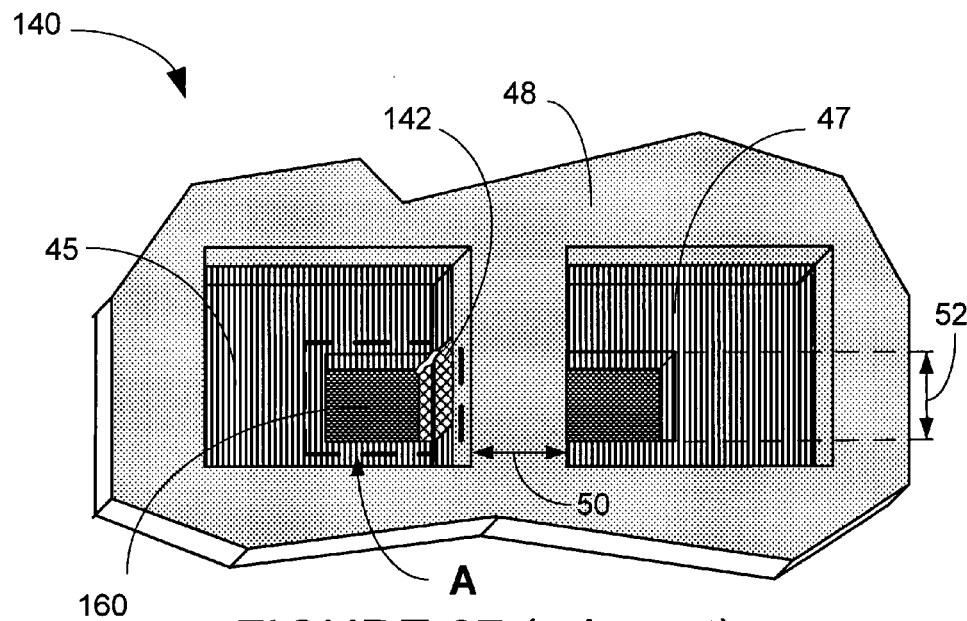
FIG. 27 is an isometric top view of a CPP read sensor of the prior art in an intermediate stage of fabrication illustrating corner shunting.
Figure 28:
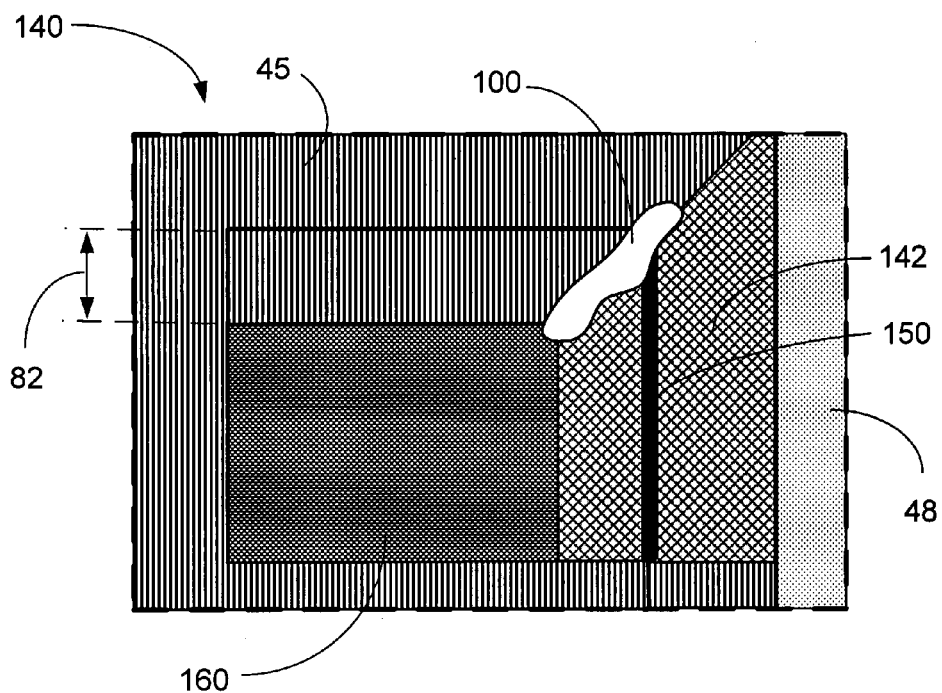
FIG. 28 is a detail view of the portion enclosed in detail box A of FIG. 27 illustrating corner shunting.

Reference is now made to FIGS. 27 and 28 (prior art), which show exactly this condition happening. FIG. 28 is an enlarged detail view of the detail box A enclosed by dashed lines in a portion of FIG. 27. These figures show isometric views of a CPP read head sensor 140 in an intermediate stage of fabrication. The sensor material 142 has been formed on the lower electrode 160, and surrounding layers of conventional dielectric material 45, 47 have been formed around the sensor material 142 in a similar manner to that discussed above. The sensor material 142 and dielectric material 45, 47 to the left and the right of the sensor, respectively, have been milled to form the magnetic read width (MRW) dimension 50 and the stripe height 52 of the sensor 140. Note that the stripe height 52 that exists at wafer-level processing differs from the final stripe height of the sensor after the wafer has been cut into rows in the so-called slider-fabrication process, where the stripe height is further reduced by lapping to the required dimension of a functioning sensor in the read head, as is known in the art. As shown more clearly in FIG. 28, the conventional dielectric material 44 has milled at a slower rate than the sensor material 142, leaving a step height 82, as in the discussion above. The tunnel barrier layer 150 is shown as part of the sensor material 142.

In the course of milling operations, residual material 100 is generated, which can be partly composed of small particles of the sensor material 142, and hence may be electrically conductive. This residual material 100 is especially difficult to remove from the corner areas of the sensor 140. In the prior art, using conventional dielectric 45, generally alumina, the milling rate of the dielectric does not closely match the milling rate of the sensor material 142, and thus a residual step height 82 remains between the alumina 45 and the sensor material 142. The step height 82 of the conventional dielectric 45 allows the residual material 100 to accumulate in the corners until it bridges across the tunnel barrier material 150 and creates an unwanted electrical path to the lower electrode 160 by creating an electrical shunt that "shorts out" the sensor. This is known as "corner shunting". This is, of course, undesirable, and the following FIGS. 29 and 30 show how this problem is solved by the use of the method of the present invention.

Figure 29:
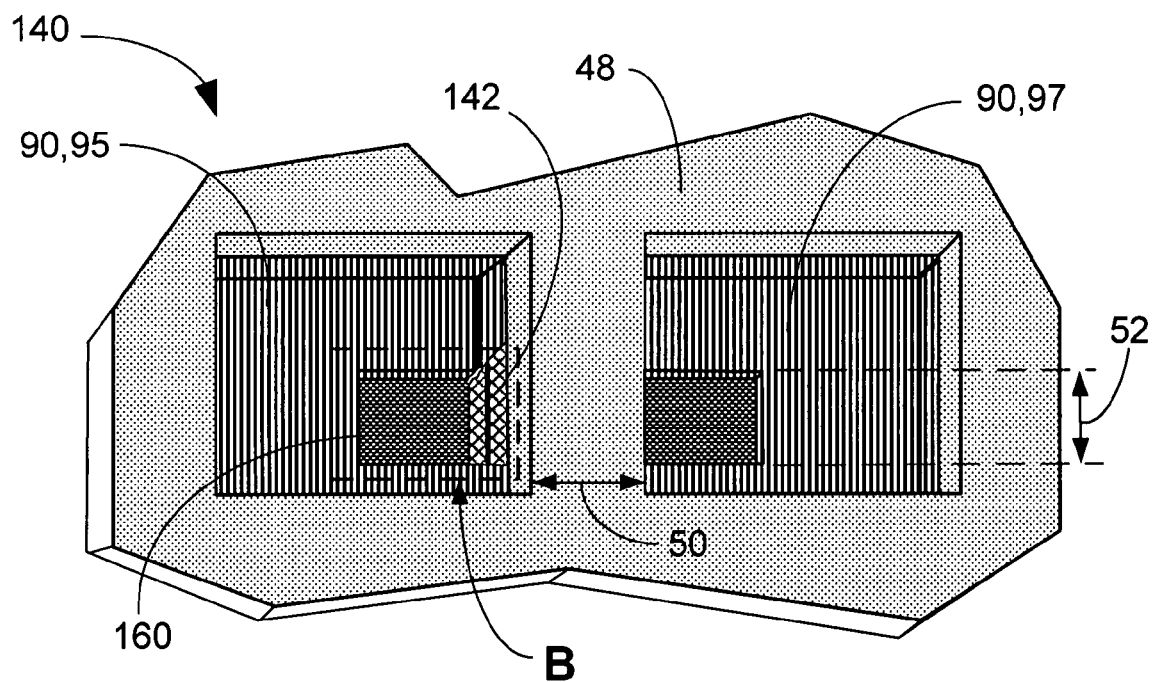
FIG. 29 is an isometric top view of a CPP read sensor of the present invention in an intermediate stage of fabrication illustrating how corner shunting is avoided.
Figure 30:
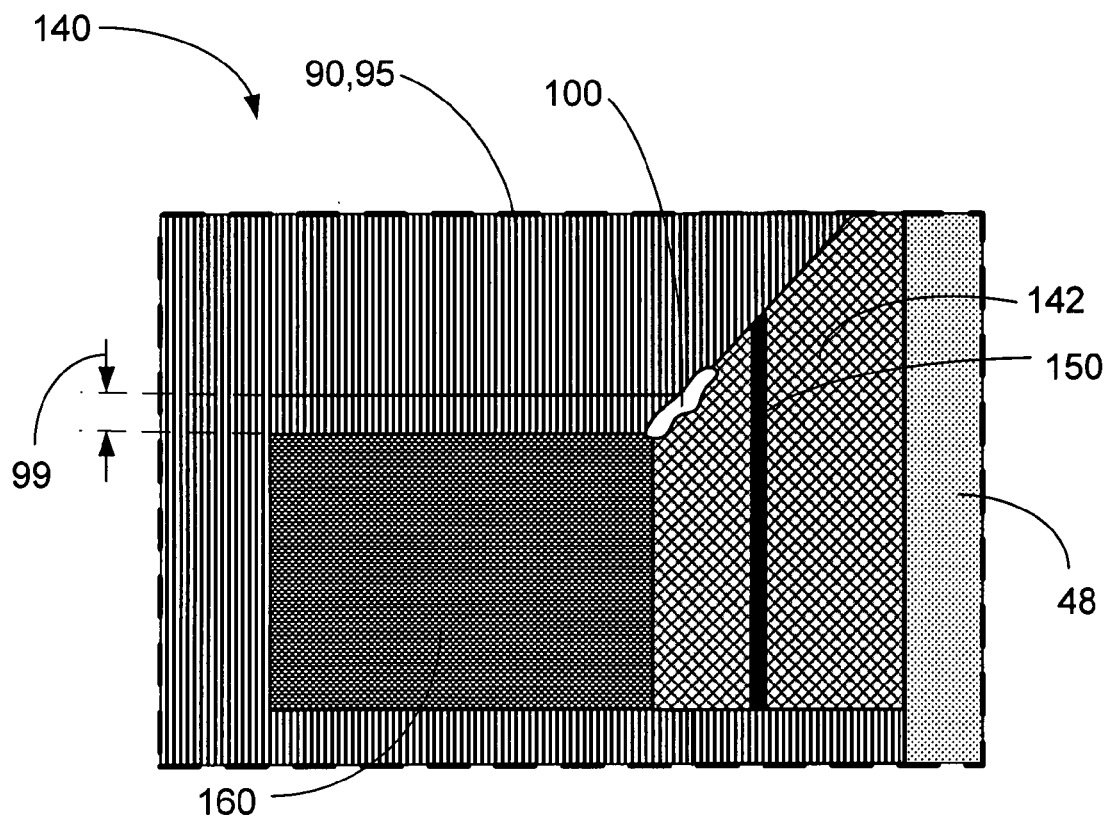
FIG. 30 is a detail view of the portion enclosed in detail box B of FIG. 29 illustrating how corner shunting is avoided.

FIG. 30 is an enlarged detail view of the detail box B enclosed by dashed lines in a portion of FIG. 29. These figures again show isometric views of a CPP read head sensor 140 in the same intermediate stage of fabrication. Once again, the sensor material 142 and dielectric material, this time using fast-milling dielectric material 90, on the left of the sensor 95, and on the right of the sensor 97, have been milled to form the magnetic read width (MRW) dimension 50 and the stripe height 52 of the sensor 140. The fast-milling dielectric material 90, 95, 97 as used in the present invention, results in a much reduced residual step height 99. Accumulated milling residue 100 which builds up in the corner cannot bridge across the tunnel barrier layer 150, and thus corner shunting of this type is eliminated. As will be discussed below, it is possible that this residual step height 99 can be a negative value if the dielectric material is completely removed, and the underlying electrode material 160 is milled into slightly.

In a similar manner to that discussed above, FIG. 31 shows a top plan view of a portion of a wafer 141 as it is being prepared for shaping into a CPP sensor 140. The sensor material region 142 is shown to be bounded by first dielectric material region at the back side of the sensor 44 and second dielectric material region at the front of the sensor 46 as before. In the prior art, these are preferably chosen to be alumina so that these make up first and second alumina regions 54, 56. A band of masking material 48 such as photoresist is then deposited to protect the material of the sensor material region 142, and first and second dielectric material regions 44, 46 from being cut away during shaping processes such as ion milling. The width of the band of masking material 48 establishes the eventual width of the read head sensor 140 and thus the magnetic read width (MRW) 50. The height of the sensor material region 142 establishes the stripe height 52 of the sensor 140 during the wafer process.

Figure 31:
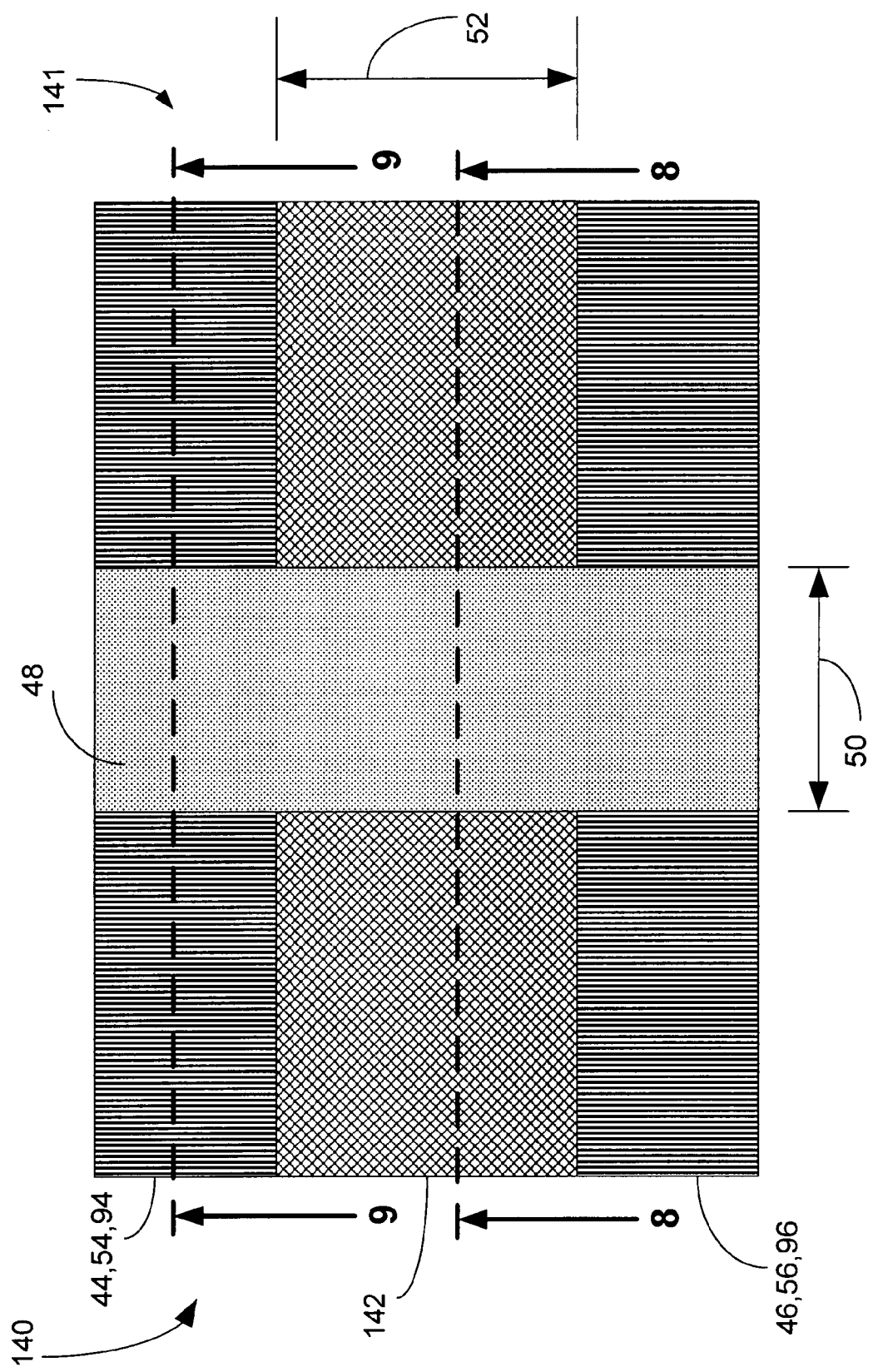
FIG. 31 shows a top plan view a portion of a CPP read sensor showing strips of alumina and sensor material and photoresist material.

In a similar manner to that discussed above, the following series of figures will depict the cross-sectional views of the material stacks of the CPP sensor as taken through section lines 8-8 and 9-9. The series of views of cross-sections of the sensor region 142, as taken through line 8-8 in FIG. 31, and the first alumina region 54, as taken through line 9-9 of FIG. 31 are shown side-by-side for comparison in FIGS. 32-41. FIGS. 32-41 show the cross-sections as seen in the prior art, using alumina as the dielectric material, and FIGS. 42-51 show the cross-sectional views of a first fast-milling dielectric material 94 region, as in the method of the present invention.

Comparable stages of fabrication of a sensor layer stack 158 in the sensor material region 142 are shown in FIGS. 32, 34, 36, 38, and 40 and of an alumina stack 60 in the alumina region 54 in FIGS. 33, 35, 37, 39 and 41, respectively. Since the relative heights of the layers at each stage of fabrication is of interest here, the bottom of the sensor layer stack 158 and the bottom of the alumina layer stack 60, are aligned in the pairs of drawings.

Figure 32:
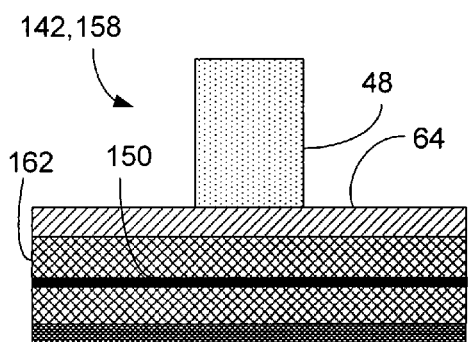
Figure 33:
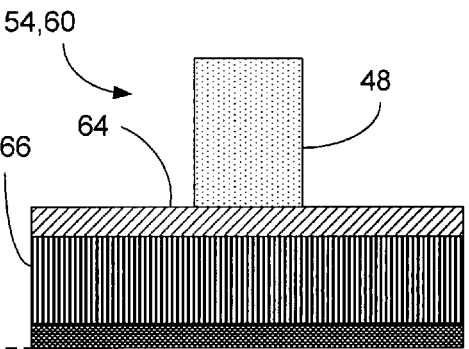

In the first stage, FIG. 32 shows the electrode layer 160 upon which are formed a layer of sensor material 162, including the tunnel barrier layer 150, a protective layer 64, and a layer of masking material 48. FIG. 33 shows the electrode layer 160 followed by a layer of alumina 66, a protective layer 64 and masking material 48.

Figure 34:
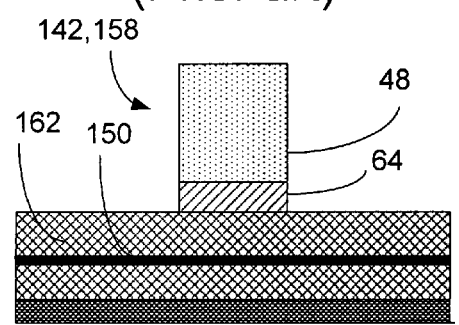
Figure 35:
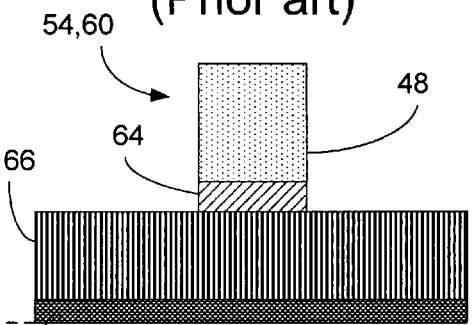

Reactive Ion Etching (RIE) is next performed to shape the protective layer material 64 in both FIGS. 34 and 35.

Figure 36:
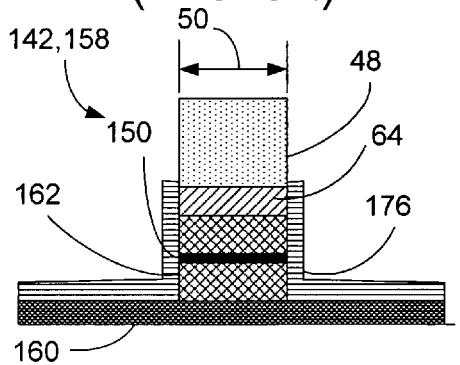
Figure 37:
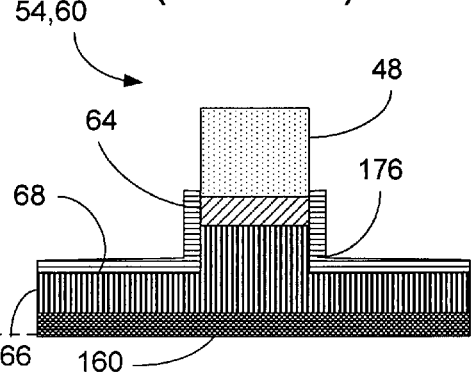

FIGS. 36 and 37 show the effect of a shaping operation such as ion milling, which narrows the sensor material 162 to the dimensions of the mask material 48 and establishes the magnetic read width (MRW) 50. FIG. 37 shows that due to its slower milling rate, the alumina layer remaining as a residual step 68 may be 150-300 Å thick, as compared to a typical sensor 162 material thickness of 300–400 Å. A layer of insulating material 176 is formed on both the sensor stack 158 and the alumina layer stack 60. This insulating material prevents electrical shorts and is another important difference from the structure of the CIP read head discussed earlier.

FIGS. 38 and 39 show the effects of depositing hard bias material 170 on both the sensor material region 142, and the first alumina region 54. The hard bias material 170 is used to magnetically bias magnetic domains in certain layers of the sensor material 142. It is also generally electrically conductive, and this is the reason that the insulating layer 176 is important in a CPP configuration, to maintain electrical isolation. The hard bias material 170 is deposited in a blanketing layer over both the sensor material region 142 and alumina region 54. In the sensor region 142, the height of the masking material 48 is such that the hard bias material 170 on the masking material 48 is removed vertically far enough from the material 172 deposited on the sides of the masking material 48 that a gap 74 remains or a thin separation layer separates the hard bias material cap 180 from the other hard bias material 170.

However, in the alumina region 54, shown in FIG. 39, since the residual step 68 remains, the hard bias material 170 is raised vertically by this step height 82, as shown by the two set of arrows. Consequently, there is not enough vertical displacement and no gap remains. The side material 172 commonly forms bridges 84 between the cap 180 and the remaining hard bias material 170.

The next process, shown in FIGS. 40 and 41, is a CMP (Chemical Mechanical Polishing) assisted liftoff. As shown in FIG. 40, this is intended to remove the cap 180 and the masking material 48 from the sensor 162. However, as discussed above with reference to FIG. 39, in the alumina region 54, the masking material 48 has been unintentionally encapsulated by the hard bias material 170, which may not be removed by the CMP assisted process. Thus, this leaves material behind the sensor, which must be removed if the sensor 162 is to function properly. This is not shown here, but is analogous to the condition discussed above with reference to the CIP configuration and shown in FIG. 15 above.

Alternatively, the CMP process may indeed remove the cap 180, and plane the hard bias material 170 down to the level of the protective layer 64, as seen in FIGS. 40 and 41. However, due to the residual step 66 of the alumina layer 68, the hard bias material 170 is raised higher then it should be, so when the CMP process laps it down to the level of the protective layer 64, the hard bias layer 170 is reduced by the same thickness of the step height 82 of excess alumina 66 below it. The effectiveness of the hard bias material 170 to bias the free layer (not shown) of the sensor is dependent upon the thickness of material included. Since the thickness is thus reduced, the effectiveness of the hard bias material 170 is likewise reduced and performance of the sensor 140 may be compromised.

In contrast, FIGS. 42-51 show the method of fabrication of a CPP sensor of the present invention. In place of alumina, a dielectric material having a milling rate more closely comparable to that of the sensor material is used. As previously discussed, this material shall be referred to as fast-milling dielectric 90. A partial list of materials, which may be used, include $Ta_2O_5$, $SiO_2$, $Si_3N_4$, AlN, variable compositions of Al—Si—O—N, $HfO_2$, $ZrO_2$, and $Hf_{1-x}Si_xO_2$. It will be understood by those skilled in the art that this list is not to be considered limiting and that many other materials would fit the definition of fast-milling dielectrics.

In a similar manner to that shown before, FIG. 31 shows the regions of sensor material, and a first region of fast-milling dielectric material 94 and second region of fast-milling dielectric material 96. As before, a series of views of cross-sections of the sensor region 42, as taken through line 8-8 of FIG. 31 and the first fast-milling material region 94, as taken through line 9-9 of FIG. 31 are shown, this time in FIGS. 42-51. Comparable stages of fabrication of a sensor layer stack 158 in the sensor region 142 are shown in FIGS. 42, 44, 46, 48, and 50 and of a fast-milling dielectric stack 92 in the first fast-milling dielectric material region 94 in FIGS. 43, 45, 47, 49, and 51, respectively. Once again, the bottom of the sensor layer stack 158 and the fast-milling dielectric stack 92, are coincident lying within the same plane in the pairs of drawings.

Figure 42:
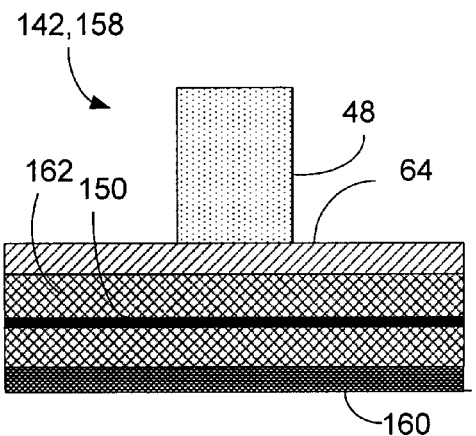
Figure 43:
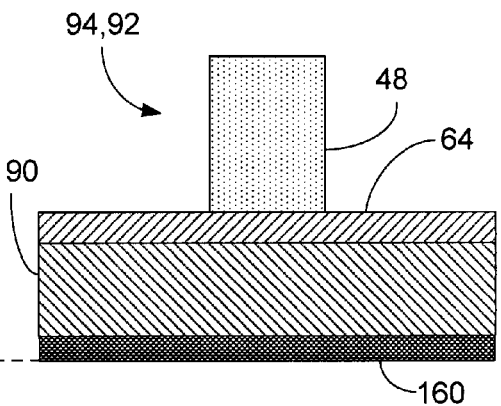

In the first stage, FIG. 42 shows the electrode layer 160 upon which are formed a layer of sensor material 162, including the tunnel barrier layer 150, a protective layer 64, and a layer of masking material 48. FIG. 43 shows the fast-milling dielectric stack 92 of the first fast-milling region 94, including the electrode layer 160 followed by a layer of fast-milling dielectric material 90 a protective layer 64 and masking material 48.

Figure 44:
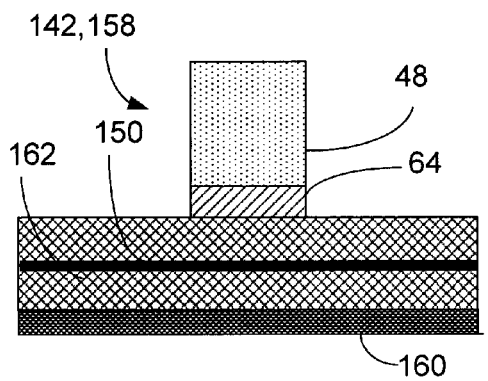
Figure 45:
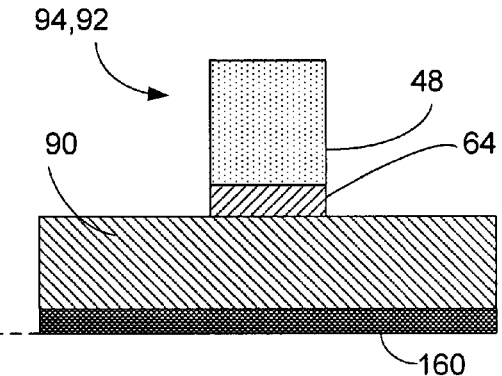

Next Reactive Ion Etching (RIE) is performed to shape the protective layer material 64 in both the sensor layer stack 158 and the fast-milling dielectric stack 92 as seen in FIGS. 44-45.

Figure 46:
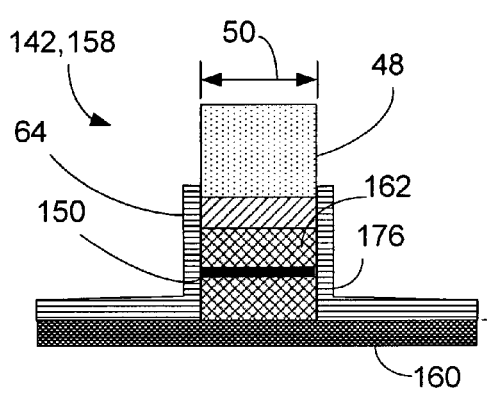
Figure 47:
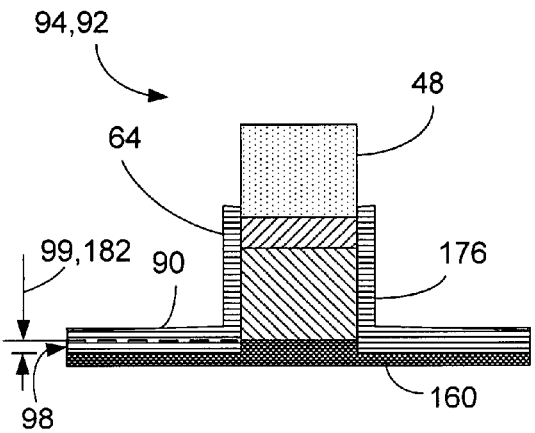

FIGS. 46-47 show the effect of ion milling, using any of a variety of ion-beam, etch tools, and which narrows the sensor material 162 to the dimensions of the mask material 48 and establishes the magnetic read width (MRW) 50. The fast-milling dielectric stack 92, due to its faster, but not exactly matching milling rate, may still retain a reduced residual step 98 having a residual step height 99 in a similar manner to that shown in FIG. 21 of the CIP configuration. This is much reduced compared to the residual step 68 of the prior art having residual step height 82 (see FIG. 39). The layer of insulating material 176 is formed on both the sensor layer stack 158 and the fast-milling dielectric stack 92, as described above.

Alternatively, the fast-milling dielectric material 90 may mill even slightly faster then the material of the sensor stack 158. This may allow all of the fast-milling dielectric 90 in this region to be removed, as well as thin layer of the electrode material 160. This results in a negative step height 182, which is shown in FIGS. 47, 49 and 51. It is believed that this negative step height, or reduced electrode thickness will not negatively affect performance of the read head, if the negative step height is within the range of 0 to 300 Å.

FIGS. 48 and 49 show the effects of depositing the hard bias material 170 on both regions 142, 94. In the sensor region 142, the height of the masking material 48 is such that the hard bias material 170 on the masking material 48 is removed vertically far enough that a gap 74 or a thin area remains, allowing for easy removal of the bias material cap 180. In comparison, in the fast-milling dielectric stack 92 of the present invention, the reduced residual step 98 has a residual step height 99, 182, which is small enough, (or even negative, as shown in the figure) that an even larger gap 74 or a thin area again remains. The hard bias material cap 180 is thus easily removed. Also, the thickness of the hard bias material 170 is not compromised as in the case of the prior art discussed above, and thus the biasing effect of the hard bias layer 170 is also not reduced.

When CMP assisted liftoff is completed, as shown in FIGS. 50 and 51, the cap 180 and the masking material 48 are removed from both the sensor 162, and the fast-milling dielectric stack 92. The result is a read sensor 140 that does not encounter the problems discussed above pertaining to corner shunting.

While the present invention has been shown and described with regard to certain preferred embodiments, it is to be understood that modifications in form and detail will no doubt be developed by those skilled in the art upon reviewing this disclosure. It is, therefore, intended that the following claims cover all such alterations and modifications that nevertheless include the true spirit and scope of the inventive features of the present invention.

What is claimed is:

1. A method for fabricating a CPP read head having a CPP read head sensor and a hard bias layer, said method comprising:
   A) depositing a strip of sensor material in a sensor material region;
   B) depositing strips of fast-milling dielectric material in first and second fast-milling dielectric material regions adjacent to said sensor material region;
   C) depositing a protective layer on said sensor material region and said first and second fast-milling material regions;
   D) depositing a layer of masking material on said strip of sensor material and said strips of fast-milling dielectric material to provide masked areas and exposed areas of said sensor material region and said first and second fast-milling dielectric material regions;
   E) providing a shaping source which shapes said exposed areas;
   F) depositing said hard bias material on said region of sensor material and said first and second regions of fast-milling dielectric material to form a cap of hard bias material on each of these regions;
   G) removing said cap of hard bias material and said masking material from each of these regions.

2. The method of claim 1, wherein:
said fast-milling dielectric of B is chosen from a group consisting of $Ta_2O_5$, $SiO_2$, $Si_3N_4$, AlN, variable compositions of Al—Si—O—N, $HfO_2$, $ZrO_2$, and $Hf_{1-x}Si_xO_2$.

3. The method of claim 1, wherein:
after E, said exposed areas of said fast-milling dielectric produce a residual step height of less than 100 Å.

4. The method of claim 1, wherein:
after E, said exposed areas of said fast-milling dielectric produce a residual step height which is negative.

5. The method of claim 1, wherein:
said masking material of D is photoresist.

6. The method of claim 1, wherein:
said shaping source of E is ion-beam, etch tools.

7. The method of claim 1, wherein:
said sensor material is a plurality of layers of material, which includes a tunnel barrier layer.

8. A method for fabricating a CPP read head for a hard disk drive having a CPP read head sensor and a hard bias layer, said method comprising:
   A) forming a sensor layer stack in a sensor material region;
   B) forming fast-milling dielectric stacks in first and second fast-milling dielectric material regions adjacent to said sensor material region;
   C) depositing a layer of masking material on said sensor layer stack and said fast-milling dielectric stacks;

D) shaping said sensor layer stack to desired track width and shaping said fast-milling dielectric stacks to have a reduced residual step height;

E) depositing said hard bias material on said region of sensor material and said first and second regions of fast-milling dielectric material to form and a cap of hard bias material on each of these regions;

F) removing said cap of hard bias material from each of these regions.

9. The method of claim 8, wherein:
said fast-milling dielectric of B is chosen from a group consisting of $Ta_2O_5$, $SiO_2$, $Si_3N_4$, AlN, variable compositions of Al—Si—O—N, $HfO_2$, $ZrO_2$, and $Hf_{1-x}Si_xO_2$.

10. The method of claim 8, wherein:
after D, said exposed areas of said fast-milling dielectric produce a residual step height of less than 100 Å.

11. The method of claim 8, wherein:
after D, said exposed areas of said fast-milling dielectric produce a residual step height which is negative.

12. The method of claim 8, wherein:
said masking material of D is photoresist.

13. The method of claim 8, wherein:
said shaping source of E is ion-beam, etch tools.

14. The method of claim 8, wherein:
said sensor material is a plurality of layers of material including a tunnel barrier layer.

15. A magnetic head having a CPP read head for a hard disk drive, comprising:

a sensor stack that has been shaped into a CPP sensor;

stacks of fast-milling dielectric material adjacent to said sensor stack, said stacks of fast-milling dielectric material being shaped along with said sensor stack so that a residual step of step height of 100 Å or less remains in first and second fast-milling dielectric material regions adjacent to said sensor material region; and, a hard bias layer which has been deposited over said sensor stack and fast-milling dielectric stacks, such that separate caps are formed due to the reduced residual step height, and said caps are removed by CMP processes.

16. The magnetic head of claim 15, wherein:
said residual step height is negative.

* * * * *